US012737595B2

(12) United States Patent
Saxena et al.

(10) Patent No.: US 12,737,595 B2
(45) Date of Patent: Sep. 15, 2026

(54) GENERATIVE ARTIFICIAL INTELLIGENCE MODEL ALIGNMENT

(71) Applicant: TRUSTWISE INC., Austin, TX (US)

(72) Inventors: Manoj Saxena, Austin, TX (US); Matthew Barker, Edenbridge (GB); Avinash Saxena, Katy, TX (US); Evan Thomas, Durham (GB); James Carr, Northumberland (GB)

(73) Assignee: TRUSTWISE INC., Austin, TX (US)

( * ) Notice: Subject to any disclaimer, the term of this patent is extended or adjusted under 35 U.S.C. 154(b) by 0 days.

(21) Appl. No.: 19/329,387

(22) Filed: Sep. 15, 2025

(65) Prior Publication Data

US 2026/0010770 A1 Jan. 8, 2026

Related U.S. Application Data

(63) Continuation of application No. 18/936,891, filed on Nov. 4, 2024.

(60) Provisional application No. 63/661,519, filed on Jun. 18, 2024.

(51) Int. Cl.

| | |
|---|---|
| ***G06N 3/04*** | (2023.01) |
| ***G06F 21/62*** | (2013.01) |
| ***G06N 3/0475*** | (2023.01) |
| ***G06N 3/0895*** | (2023.01) |

(52) U.S. Cl.

CPC ....... *G06N 3/0475* (2023.01); *G06F 21/6245* (2013.01); *G06N 3/0895* (2023.01)

(58) Field of Classification Search

CPC .................................................... G06N 3/0475

See application file for complete search history.

(56) References Cited

U.S. PATENT DOCUMENTS

| | | | | |
|---|---|---|---|---|
| 11,875,130 | B1 * | 1/2024 | Bosnjakovic | G06N 5/022 |
| 2023/0259705 | A1 * | 8/2023 | Tunstall-Pedoe | G06N 3/0499 704/9 |
| 2024/0370769 | A1 * | 11/2024 | Sheth | G06N 20/00 |
| 2024/0386253 | A1 * | 11/2024 | White, Jr. | G06F 40/166 |

OTHER PUBLICATIONS

Ngweta et al ("Aligners: Decoupling LLMs and Alignment" Mar. 2024) (Year: 2024).*

Wang et al ("Aligning Large Language Models with Human: A Survey" Jul. 2023) (Year: 2023).*

Cao et al ("Towards Scalable Automated Alignment of LLMs: A Survey" Jun. 3, 2024) (Year: 2024).*

Liu et al ("Trustworthy LLMs: a Survey and Guideline for Evaluating Large Language Models' Alignment" Mar. 2024) (Year: 2024).*

* cited by examiner

*Primary Examiner* — Lut Wong
(74) *Attorney, Agent, or Firm* — Maschoff Brennan

(57) ABSTRACT

A method may include providing a query and context associated with the query to a generative artificial intelligence model, in which the generative artificial intelligence model may be trained to generate a response to the query based on the context. The method may further include obtaining one or more policies, in which at least one of the one or more policies are specific to the user. An analysis of the response may be performed based on the one or more policies. Based on the analysis, alignment issues in the response may be identified. The response may be refined to improve the alignment issues.

20 Claims, 4 Drawing Sheets

GENERATIVE ARTIFICIAL INTELLIGENCE MODEL ALIGNMENT

CROSS-REFERENCE TO RELATED APPLICATIONS

This patent application claims priority to U.S. Provisional Application No. 63/661,519 filed Jun. 18, 2024, which provisional is incorporated herein by specific reference in its entirety.

BACKGROUND

Field

The present invention relates to aligning generative artificial intelligence (AI) models with user specifications.

Description of the Related Art

As the value and use of data continues to increase, individuals and businesses seek additional ways to process and store information. One approach to data processing includes the use of generative AI systems such as a large language model (LLM). Such models may allow entities to access the data in a convenient and timely manner. For example, the LLM may be configured to take an input from a user and produce an output corresponding to the input based on the data available to the LLM. The user may obtain the output corresponding to the input without the need to go through the data manually. As use of generative AI systems increase, reliance of the users on the systems may also increase. To help the generative AI systems provide accurate outputs, the generative AI systems may be aligned with human values and/or various standards. For example, the generative AI systems may be aligned to global, national (e.g., U.S. National Institute of Standards and Technology (NIST) AI Risk Management Framework (AI RMF), EU AI Act, etc.), and/or industry policies (e.g., Financial Conduct Authority (FCA) Consumer Duty).

SUMMARY OF THE INVENTION

According to an aspect of an embodiment, a method may include providing a query and context associated with the query to a generative artificial intelligence model, in which the generative artificial intelligence model may be trained to generate a response to the query based on the context. The method may further include obtaining one or more policies, in which at least one of the one or more policies are specific to the user. An analysis of the response may be performed based on the one or more policies. Based on the analysis, alignment issues in the response may be identified. The response may be refined to improve the alignment issues.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1:
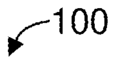
FIG. 1 illustrates an example AI optimizing system, in accordance with one or more embodiments of the present disclosure.
Figure 1:
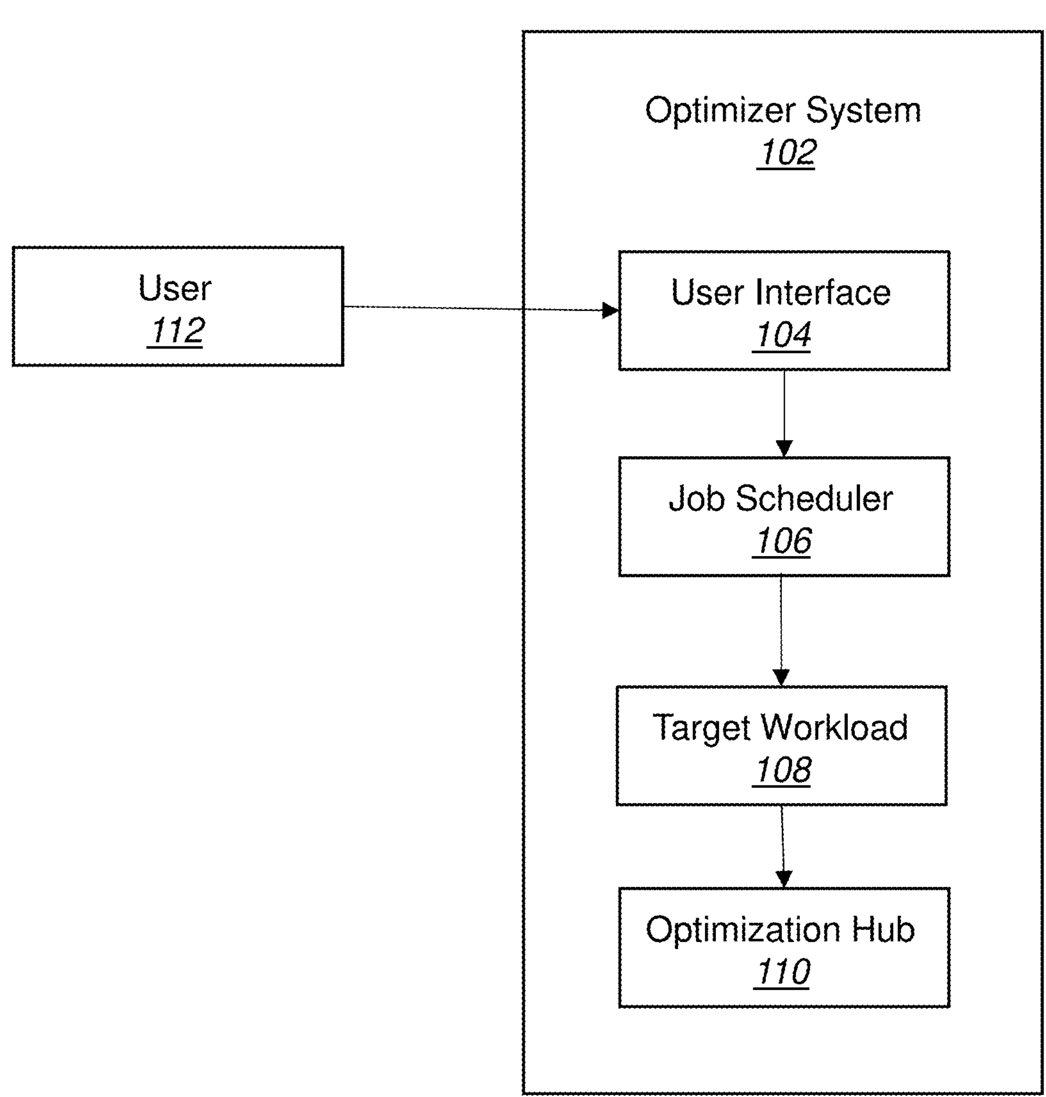

Generative artificial intelligence (Gen AI) systems and/or models such as a large language model (LLM) may be configured and/or trained to generate responses to questions and/or queries based on contextual data available to the Gen AI models. For example, the Gen AI models may be trained to identify patterns in the contextual data to generate answers to the queries. Such process may allow convenient access to the contextual data without manual digestion of the contextual data. In some circumstances, the Gen AI systems may produce responses which may not be adequately formatted and/or assured. For example, the Gen AI systems may produce unsafe responses or responses that may include inaccuracy, bias, disrespectfulness, privacy violations, ambiguity, irrelevance, or other issues. Such issues may decrease confidence and/or trust in the Gen AI systems by users using the systems. In some circumstances, one or more operations may be performed such that instances of such unsafe responses may be reduced.

Gen AI assurance may include practices and/or processes that may help Gen AI systems to improve providing responses that are more reliable, safe, ethical, and aligned with human values and regulatory requirements. Some traditional Gen AI assurance practices may include modifying and/or filtering training data; monitoring and moderating responses; implementing feedback loops where users report unsafe responses; providing ethical guidelines in AI development; and/or including human oversight where human operators review the response.

However, implementing such practices may not be cost effective and/or not feasible in larger scale. For example, building a new Gen AI system from scratch and/or customizing an existing Gen AI system for a specific entity or purpose may be highly costly. Additionally, requiring human oversight for every response may add additional time and cost to the operation of the Gen AI systems. As such, the assurance practices may be best implemented by large Gen AI developers that build the Gen AI systems. However, the large Gen AI developers generally do not have an incentive to perform assurance practices that adhere to specific entities and/or users. For example, large-scale LLM (e.g., a type of Gen AI system) builders may not have a reason or may not be adaptable to implement specific assurance practices for different users. Such large-scale LLM builders may focus on adhering to high-level standards and/or regulations without providing specific practices.

Another approach to improve LLMs may include retrieval-augmented generation (RAG). RAG may include a method used to improve the quality of generated text by incorporating information retrieved from external sources. For example, RAG may incorporate the domain-specific knowledge into the LLM, which may allow the LLM to more successfully answer questions related to such domain-specific knowledge. However, mere RAG operations without further guidance may lead to further problems. For example, RAG aims to better the quality of responses by only parsing the most relevant context chunks from the document into the LLM. However, when a query is unrelated to the document, a typical RAG pipeline may still retrieve what it measures as the most relevant context from the documents which may lead to confident responses containing non-factual, misleading information, or hallucinations.

The RAG may result in responses containing information from both the provided documents and the internal knowledge of the LLM, which may lead to extrinsic hallucinations (e.g., information that cannot be verified from the provided context) or self-contradictions (as the information in the provided context may differ from the internal knowledge).

According to one or more embodiments of the present disclosure, an AI optimizing system may be configured to perform one or more assurance operations such that the Gen AI systems may be improved. In particular, as described in detail in the present disclosure, the AI optimizing system may be configured to improve alignment of the Gen AI systems. In particular, existing Gen AI models may be tested based on user-specific policies and/or standards to identify Gen AI models that are best-suited for the user and to further improve the Gen AI models and/or responses generated using the Gen AI models to adhere to the user-specific policies.

Embodiments of the present disclosure will be exampled with reference to the accompanying drawings.

FIG. 1 illustrates an example Gen AI optimizing environment 100, in accordance with one or more embodiments of the present disclosure. In some embodiments, the environment 100 may include an optimizer system 102. In some embodiments, the optimizer system 102 may include a user interface 104, a job scheduler 106, a target workload 108, and/or an optimization hub 110.

In some embodiments, the user interface 104 may include any device and/or system that may allow a user 112 to communicate with the optimizer system 102. For example, the user interface 104 may include a platform in which the user 112 may interact with AI models, monitor performances, and/or provide feedback. The user interface 104 may be formatted in any suitable way to provide the platform to the user 112. For example, the platform may be provided as an application, a web application, among others. In some embodiments, the user 112 may provide, via the user interface 104, AI optimization configurations to be run. For example, the user 112 may specify types of AI optimization operations to be performed by the optimizer system 102.

In some embodiments, the job scheduler 106 may be configured to manage and/or automate execution of tasks and/or jobs at specified times and/or under certain conditions. For example, the job scheduler 106 may be configured to schedule different AI optimization jobs, such as optimizing alignment, safety, and/or performance of AI models. The job scheduler 106 may determine which AI optimization jobs to be performed and in which order to perform the AI optimization jobs based on the AI optimization configuration provided by the user 112.

In some embodiments, the job scheduler 106 may send the scheduled jobs and/or operations to access the target workload 108. In some embodiments, the target workload 108 may include different Gen AI systems and/or models that may be optimized and/or other user 112 specified data such as context.

In some embodiments, the target workload 108 and the AI optimization configurations may be provided to the optimization hub 110. In some embodiments, the optimization hub 110 may be configured to run and deploy the AI optimization jobs such as optimizing alignment, safety, and/or performance. For example, the optimization hub 110 may include one or more modules and/or systems that may observe, analyze, and/or optimize the AI systems.

Modifications, additions, or omissions may be made to the environment 100 without departing from the scope of the present disclosure. For example, in some embodiments, the environment 100 may include any number of other components that may not be explicitly illustrated or described. Further, depending on certain implementations, the environment 100 may not include one or more of the components illustrated and described.

Figure 2:
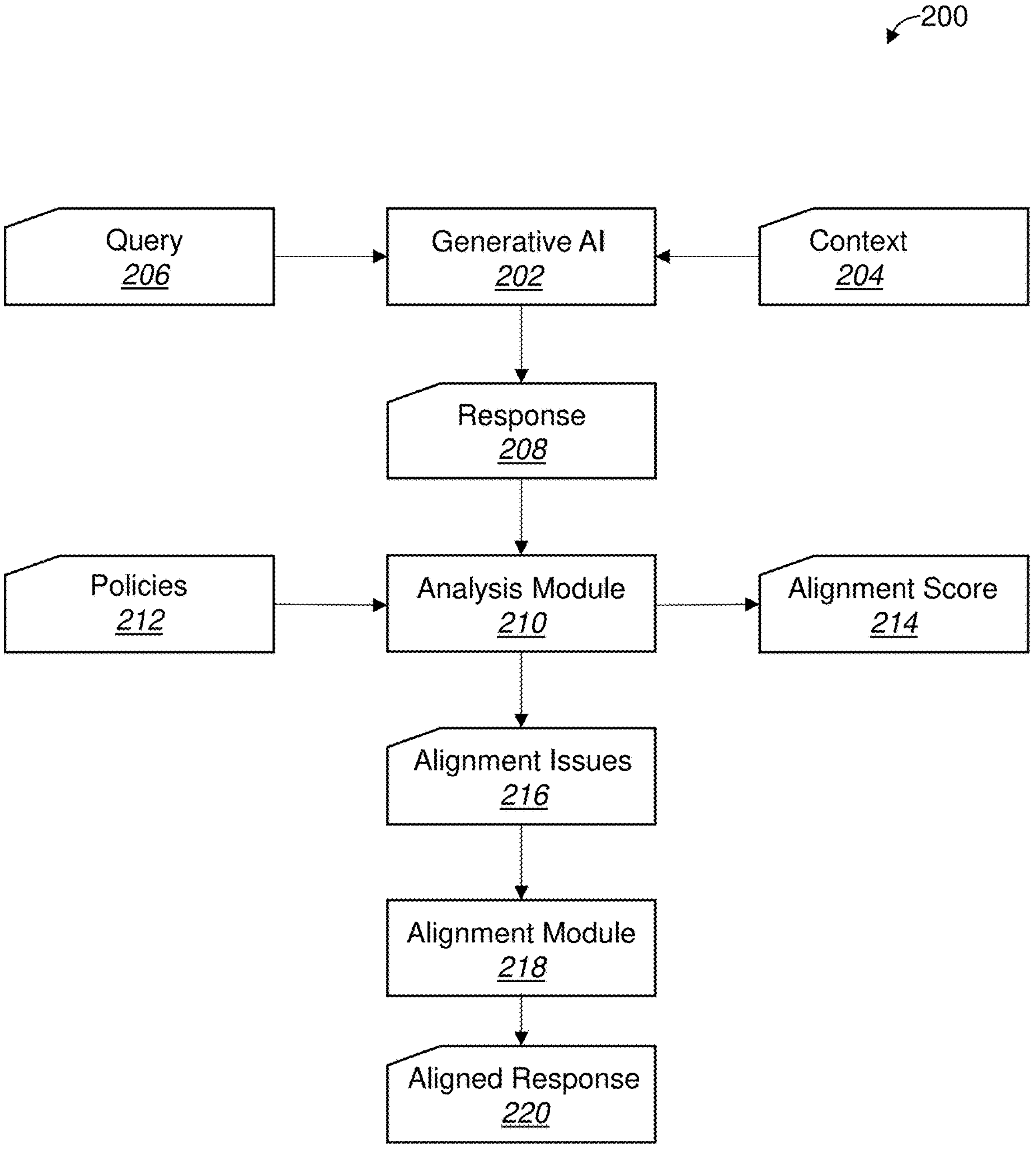
FIG. 2 shows a flow diagram of an AI model alignment process, in accordance with one or more embodiments of the present disclosure.

FIG. 2 illustrates an example system 200 configured to perform alignment analysis of a Gen AI model 202, in accordance with one or more embodiments of the present disclosure. In some embodiments, the Gen AI model 202 may include any suitable Gen AI models such as an LLM that may be trained to generate a response to a query. In some embodiments, the Gen AI model 202 may be trained using training data. The training data may provide the Gen AI model 202 with various scenarios and patterns, such that the Gen AI model 202 may learn to identify such patterns in newly presented data. For example, the Gen AI model 202 may be configured as a customer service model associated with a business. In such instances, the training data and/or context may include data related to product and/or services provided by the business, previous interactions with customers, manuals on how to interact with the customers, etc.

While a single Gen AI model 202 is illustrated, multiple Gen AI models or LLMs may be run through the system 200 concurrently and/or in parallel. For example, the Gen AI model 202 may represent one or more Gen AI models.

In some embodiments, the Gen AI model 202 may be configured to receive a query 206. In some embodiments, the query 206 may include questions, prompts, and/or any other instructions that may cause the Gen AI model 202 to generate a response 208. For example, continuing the example of the customer service model above, the query 206 may include a question about a product associated with the business. In some embodiments, the Gen AI model 202 may obtain context 204 related to the query 206. In these and other embodiments, the context 204 may include data that may provide background information for determining the response 208. For instance, the context may provide information relevant to the query 206. For example, the query 206 may include a question about a product, in which case, the context 204 may include a product manual associated with the product. In some embodiments, the context may be obtained from a database or a data storage configured to communicate with the Gen AI model 202. Additionally or alternatively, the context 204 may be obtained from a user.

In some embodiments, an analysis module 210 may be configured to analyze the Gen AI model 202 based on the response 208. For example, the analysis module 210 may analyze the response 208 in view of the query 206 and/or the context 204 to analyze performance and/or alignment of the Gen AI model 202. In some embodiments, the analysis module 210 may be configured to analyze the response 208 based on one or more policies 212. In these and other embodiments, the one or more policies 212 may include standards, regulations, ethical guidelines, and/or other rules that may be applicable to the response 208. For example, the one or more policies 212 may provide guidelines and/or rules on how the Gen AI model 202 is expected to operate with respect to generating the response 208. In some embodiments, the user of the system 200 may configure the one or more policies 212 to be provided to the analysis module 210. For example, the user may specify certain policies 212 to be applied in analyzing the response 208 and/or the Gen AI model 202.

In some embodiments, the one or more policies 212 may include general policies that may be applicable to Gen AI models and/or LLMs in large. For example, the policies 212 may include global, national, and/or industry policies that may be applicable to LLMs in large. The global policies may include standards that may help ensure that the response 208 upholds global human rights and ethical standards. The national policies may help further agreement to standards such as the US NIST AI RMF and/or the EU AI Act. The industry policies may help certify the agreement of the AI models to industrial standards such as the FCA Consumer Duty.

Additionally or alternatively, the one or more policies 212 may include one or more user-specific policies that may help improve augmented business intelligence (ABI) or alignment of the Gen AI model 202 with the ethics and values of the user (e.g., an organization, a business, etc.). In some embodiments, such user-specific policies may include organization policies, use case policies, and/or end-user policies.

The organization policies may include the organization's own corporate AI use policies. For example, the organization may have internal requirements and/or restrictions on how the Gen AI model 202 may act in generating the response 208. For example, the organization policies may include corporate ethical AI policy and/or corporate communications policy, among others.

The use case policies may include policies that may be directed to specific goals, ethical standards, and/or user needs. Such policies may help users understand appropriate applications, limitations, and/or governance of the Gen AI model 202. For example, the use case policies may include approved use cases (e.g., specific applications for which the Gen AI model 202 is intended), restricted use cases (e.g., areas in which the use of the Gen AI model 202 is limited and requires additional oversight), and/or prohibited use cases (e.g., instances in which the Gen AI model 202 is not allowed to be used).

In some embodiments, the end-user policies may include policies that may help users to interact with the Gen AI model 202 in a manner that aligns with ethical standards, organization goals, and/or legal requirements. For example, the end-user policies may help, at the level of individuals, that personal data is handled in an appropriate manner, tailor the experience of AI to each user, and/or optimize the AI experience of the user.

In some embodiments, the analysis module 210 may analyze the response 208 based on the one or more policies 212 to determine how well the response 208 adheres to and/or satisfies the one or more policies 212. For example, in some embodiments, the analysis module 210 may assign one or more alignment scores 214 to the Gen AI model 202 based on the response 208 and one or more alignment metrics. The one or more alignment metrics may correspond to different criteria of analyzing and/or measuring the response 208 and/or the Gen AI model 202. In these and other embodiments, the alignment scores 214 may represent such measurements numerically. In some embodiments, the analysis module 210 may analyze the alignment of the response 208 using other types of metrics such as safety metrics (e.g., metrics related to producing correct or safe responses to queries).

In some embodiments, the metrics may be defined and/or determined based on the query 206 and relevant or policy documents. The policy documents may include various types of documents including policies that may or may not be relevant to the particular query 206. In some embodiments, a RAG pipeline may be configured to analyze the policy documents with respect to the query 206 to identify parts of the policy documents that may be relevant to the particular query 206. Such relevant parts of the policy documents may correspond to the context 204. In these and other embodiments, the system 200 may define one or more metrics that may be applicable to the query 206 based on the context 204 and the query 206.

The one or more alignment metrics may include one or more of: tone, formality, clarity, simplicity, helpfulness, and/or toxicity. The tone metric may involve determining which emotions are present in the data (e.g., textual data). To measure this, the text is encoded and analyzed by a fine-tuned model, which compares it to numerous examples of texts spanning a range of emotions. Such process results in a Tone metric, giving emotions each scored between 0 and 100, with higher scores indicating the corresponding emotion was more strongly detected.

Formality metric in evaluating text may involve determining whether a text is more formal or informal. To measure this, the text is first split into sentences. Each sentence is encoded and analyzed by a (fine-tuned), topic-classifier model, which compares it to numerous examples of texts spanning a range of formalities. Each sentence receives a formality score, from which the overall score is calculated. This process results in a Formality metric, scored between 0 and 100, with higher scores indicating the text is more formal.

Clarity metric in evaluating text may involve determining whether a text is easy to read. To measure this, data about the grammar and structure of the text is obtained, from which an overall Clarity score is calculated. This process results in a Clarity score, scored between 0 and 100, with higher scores indicating the text is easier to read. For instance, the Clarity score may be similar to a Flesch Reading Ease score in which a readability metric is used to assess how easy or difficult a text is to understand. The readability may be determined based on average number of syllables per word and the average number of words per sentence. The Clarity metric may be configured such that the Clarity score is limited to a number between 0 and 100 for more convenient understanding and comparison.

Simplicity metric in evaluating text may involve determining whether a text is easy to understand. To measure this, a corpus of the general or common literature may be split up into tokens. The frequencies of the tokens in a particular text may be determined to create a frequency table of tokens and frequencies of the tokens in the text. In instances in which tokens identified from the corpus of the general literature is not found in the text, the particular token may be assigned 0 frequency. Based on the frequency table, an overall score may be calculated. This process results in a Simplicity metric, scored between 0 and 100, with higher scores indicating the text is easier to understand.

Helpfulness metric in evaluating the response 208 may involve determining whether the response 208 contains relevant, detailed, and useful information to address the query 206. To measure this, both the query 206 and the response 208 are encoded and analyzed by a fine-tuned model, which compares them to numerous examples of helpful and unhelpful responses. This process results in a Helpfulness metric, scored between 0 and 100, with higher scores indicating more helpful answers.

Toxicity metric in evaluating text may involve determining whether the text contains harmful or offensive content. To measure this, a collection of fine-tuned models is employed, each trained to detect toxicity in different forms by comparing the text to examples of texts containing varying degrees of toxicity. The toxicity scores from each model are obtained, and an overall Toxicity score is given, along with supporting scores for specific toxic styles. This process results in a toxicity score, as well as 5 scores for different toxic styles. Each score is given between 0 and 100, with lower scores indicating the text contains a higher level of toxicity of the corresponding style.

Additionally or alternatively, the alignment scores 214 may include a comprehensive score representing all of the individual alignment scores. In these and other embodiments, the comprehensive score may be determined using any suitable method of combination, such as averaging, summing, among others.

In some embodiments, a report may be generated including at least the alignment scores 214. For example, the report may include the Gen AI model 202 and any other AI models along with respective alignment scores 214. In some embodiments, the report may be customized and/or filtered. For example, the report may be filtered based on one or more score thresholds. For example, in instances in which the alignment scores 214 range from 0 to 100, the report may be filtered such that only the Gen AI models with the alignment scores 214 above 80 may be included in the report. In some embodiments, the one or more score thresholds may include individual thresholds corresponding to the one or more alignment metrics and/or the comprehensive score.

In addition or alternative to the alignment scores 214, in some embodiments, the analysis module 210 may be configured to determine alignment issues 216 from the response 208. The alignment issues 216 may represent issues and/or reasons that caused the alignment scores 214 to drop or decrease. For example, an alignment issue may include detection of harmful or offensive content in the response 208 that caused the toxicity score to be increased.

In some embodiments, an alignment module 218 may be configured to obtain the alignment issues 216 along with the response 208. In some embodiments, the alignment module 218 may be configured to improve the response 208 with respect to the alignment issues 216 to generate an aligned response 220. For example, the alignment module 218 may modify the response 208 such that the alignment issues 216 may be reduced or eliminated. In some embodiments, the alignment module 218 may determine that the response 208 is not aligned due to heavy presence of alignment issues 216. In such instances, the alignment module 218 may dispose of the response 208. In some embodiments, heavy presence of the alignment issues 216 may refer to the response 208 with the alignment scores 214 below a threshold score. For example, in instances in which the alignment scores 214 are represented as numbers between 0 and 100, the threshold score may also be a certain number between 0 and 100 such as 30, 40, 50, 60, among others. The threshold score may be specified by the user for different implementations.

In some embodiments, the alignment module 218 may send feedback to the Gen AI model 202 concerning the operations taken to align the response 208. In these and other embodiments, the Gen AI model 202 may be improved based on the operations and the alignment issues 216 such that instances of such alignment issues 216 may be reduced.

Modifications, additions, or omissions may be made to the system 200 without departing from the scope of the present disclosure. For example, in some embodiments, the system 200 may include any number of other components that may not be explicitly illustrated or described. Further, depending on certain implementations, the system 200 may not include one or more of the components illustrated and described.

Figure 3:
FIG. 3 is a flow chart of an example method of AI model alignment process, in accordance with one or more embodiments of the present disclosure.
Figure 3:
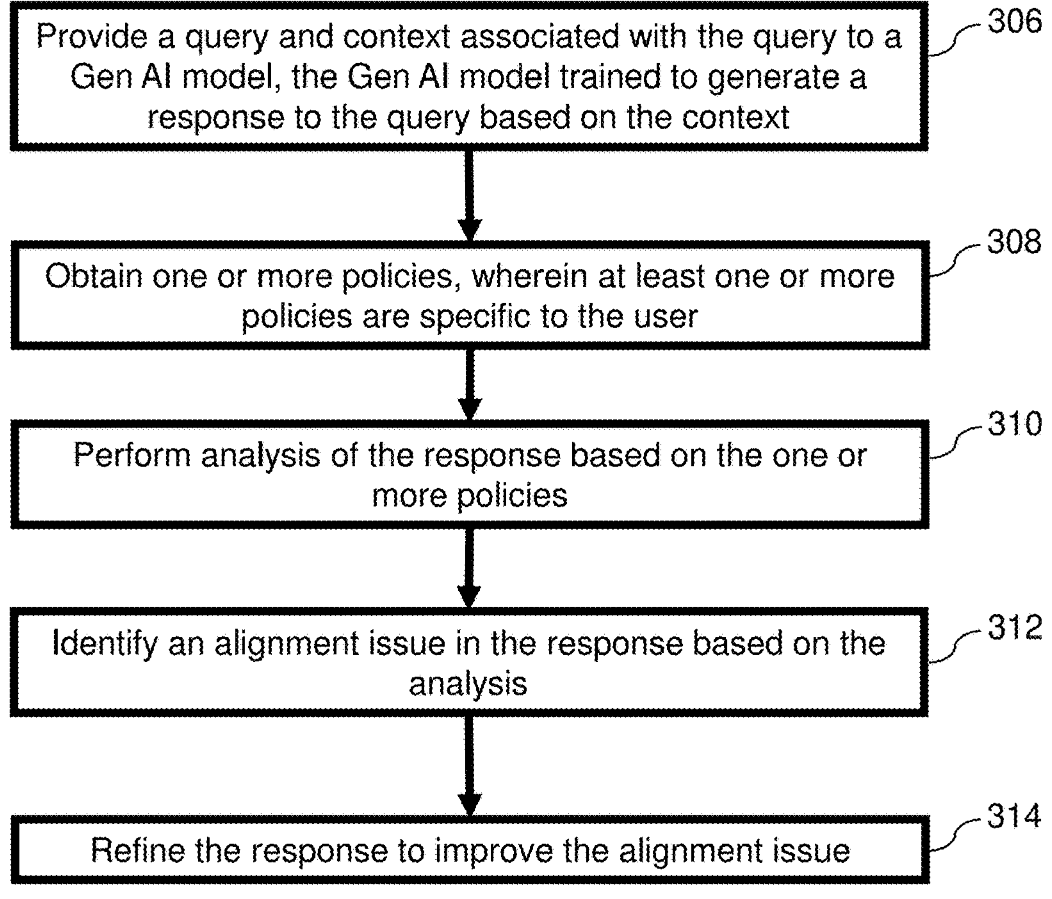

FIG. 3 is a flow chart of an example method 300 of the alignment process, arranged in accordance with at least one embodiment of the present disclosure. One or more operations of the method 300 may be implemented by any suitable systems such as the system 200 of FIG. 2 and/or the computing system 400 of FIG. 4. Although illustrated as discrete steps, various steps of the method 300 may be divided into additional steps, combined into fewer steps, or eliminated, depending on the desired implementation. Additionally, the order of performance of the different steps may vary depending on the desired implementation.

In some embodiments, the method 300 may begin at block 306. At block 306, a query and context associated with the query may be provided to Gen AI model(s). The Gen AI model(s) may be trained to generate a response to the query based on the context. In some embodiments, the Gen AI model(s) may be LLMs. In some embodiments, the Gen AI model may represent one or more individual Gen AI models. For example, multiple Gen AI models may be trained in a similar manner (e.g., using some training data). In some embodiments, the Gen AI models may be prebuilt models such as an OpenAI model, Gemini, LLaMA, BLOOM, BERT, Falcon, OPT, XGen, Mistral, among others. Additionally or alternatively, the Gen AI models may include one or more models built and/or customized by the user.

In some embodiments, the context may include background information that may be used to generate the response to the query. For example, the context may include information that may be specifically related to the query. The Gen AI model(s) may produce a human-like response to the query based on the context.

In some embodiments, the query and/or the context may be obtained from a user. In some embodiments, the query and/or the context may be provided via a secure API connection such as described with the target workload 108 of FIG. 1.

At block 308, one or more policies may be obtained. In some embodiments, at least one of the one or more policies may be specific to the user. For example, at least one of the policies may be user-specific, such as organization policies, use case policies, and/or end-user policies. In some embodiments, at least one of the one or more policies may be customized by the user. For example, the user may customize an existing policy and/or customize the user's own policy for the particular implementation of the Gen AI model. In some embodiments, the one or more policies may be provided by the user. In some embodiments, at least one of the one or more polices may be predetermined policies. For example, at least one of the policies may include global, national, and/or industrial standard policies.

At block 310, an analysis of the response may be performed based on the one or more policies. For example, the response may be analyzed to determine how well the Gen AI model adheres to standards set out in the one or more policies.

At block 312, alignment issues in the response may be identified based on the analysis. In these and other embodiments, the alignment issues may include characteristics and/or parts of the response that fail to adhere to the one or more policies. For example, the alignment issues may cause the response to be not suitable for the user.

At block 314, the response may be refined to improve the alignment issues. In some embodiments, the response may be refined using the Gen AI model. For example, the identified alignment issues may be provided to the Gen AI model with an accompanying prompt to address the alignment issues. In some embodiments, individual policies of the one or more policies that are associated with the alignment issues may also be provided to the Gen AI model. In some embodiments, only the sections of the one or more policies and/or respective alignment metrics that are relevant to the alignment issues may be provided to the Gen AI model for the response refinement. Such limited information may help reduce the workload placed on the Gen AI model. Additionally or alternatively, the response may be refined by the user. For example, the response and the identified alignment issues may be provided to the user such that the user may manually refine the response.

Modifications, additions, or omissions may be made to the method 300 without departing from the scope of the present disclosure. For example, one skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 300 may further include assigning one or more alignment scores to the response based on the analysis. In these and other embodiments, the alignment scores assigned to the response may be used to determine an overall score for the Gen AI model that generated the response. For instance, one or more responses generated by the Gen AI model may be assigned scores. The individual scores corresponding to the responses may be used to determine the overall score for the Gen AI model. In some embodiments, the one or more alignment scores may be respectively determined based on one or more alignment metrics. The alignment scores may specify standards and/or rules of analyzing the response and generating numerical scores. In some embodiments, the one or more scores may be represented as a number between 0 and 100, in which a higher number (e.g., closer to 100) represents better adherence to the one or more policies and/or one or more alignment metrics except for the toxicity metric in which instance lower number represents better adherence to the one or more policies and/or one or more alignment metrics.

In some embodiments, the one or more policies may be represented using one or more statements. For example, the statements may specify the rules and/or requirements for the Gen AI model. The statements may be scanned and/or analyzed to determine parts that may affect the response of the Gen AI model. In some embodiments, the statements may be mapped and/or associated with relevant alignment metrics, such that the analysis of the response based on an alignment metric may also represent analysis based on a relevant policy. In some embodiments, the one or more alignment metrics may include one or more of tone, formality, clarity, simplicity, helpfulness, or toxicity. In some embodiments, the alignment scores may include a comprehensive score representing different scores determined based on different alignment metrics. In some embodiments, the one or more metrics may be described in further detail in the present disclosure, such as with respect to FIG. 2.

In some embodiments, a report may be generated including at least the one or more alignment scores. In some embodiments, the report may include a subset of the assigned one or more alignment scores. For example, a score threshold may be obtained (e.g., from the user), which may be used to filter the one or more alignment scores included in the report. In some embodiments, the score threshold may set minimum alignment scores that the Gen AI models need to be included in the report. For example, Gen AI models that have alignment scores below the score threshold may be omitted and/or removed from the report. In some embodiments, the score threshold may be a universal threshold across different alignment scores. In other embodiments, the score threshold may be different across different alignment scores or metrics.

Figure 4:
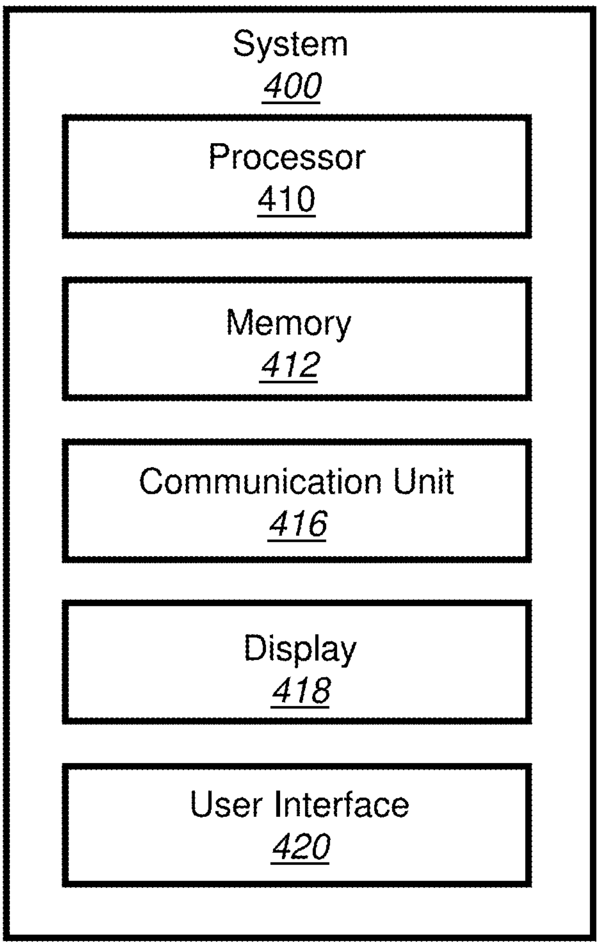
FIG. 4 illustrates a block diagram of an example computing system that may be used with the optimizer system, in accordance with one or more embodiments of the present disclosure.

FIG. 4 is a block diagram illustrating an example system 400 that may be used for optical signal amplification, according to at least one embodiment of the present disclosure. The system 400 may include a processor 410, memory 412, a communication unit 416, a display 418, and a user interface unit 420, which all may be communicatively coupled. In some embodiments, the system 400 may be used to perform one or more of the methods described in this disclosure.

For example, the system 400 may be used to assist in the performance of the method described in FIG. 4. For example, the system 400 may be used to determine a number of optical fiber amplifiers to cascade, a number of filters to cascade, and the length of the optical fiber in each of the amplifiers.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of networks or physical locations that are configured to perform individually or collectively any number of operations described herein. In some embodiments, the processor 410 may interpret and/or execute program instructions and/or process data stored in the memory 412. In some embodiments, the processor 410 may execute the program instructions stored in the memory 412.

For example, in some embodiments, the processor 410 may execute program instructions stored in the memory 412 that are related to task execution such that the system 400 may perform or direct the performance of the operations associated therewith as directed by the instructions. In these and other embodiments, the instructions may be used to perform one or more blocks of method 300 of FIG. 3.

The memory 412 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 410 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 400 F.3d 1346 (Fed. Cir. 2007). Combinations of the above may also be included within the scope of computer-readable media.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 416 may permit data to be exchanged with a network and/or any other devices or systems described in the present disclosure.

The display 418 may be configured as one or more displays, like an LCD, LED, Braille terminal, or other type of display. The display 418 may be configured to present video, text captions, user interfaces, and other data as directed by the processor 410.

The user interface unit 420 may include any device to allow a user to interface with the system 400. For example, the user interface unit 420 may include a mouse, a track pad, a keyboard, buttons, camera, and/or a touchscreen, among other devices. The user interface unit 420 may receive input from a user and provide the input to the processor 410. In some embodiments, the user interface unit 420 and the display 418 may be combined.

Modifications, additions, or omissions may be made to the system 400 without departing from the scope of the present disclosure. For example, in some embodiments, the system 400 may include any number of other components that may not be explicitly illustrated or described. Further, depending on certain implementations, the system 400 may not include one or more of the components illustrated and described.

As indicated above, the embodiments described herein may include the use of a special purpose or general-purpose computer (e.g., the processor 410 of FIG. 4) including various computer hardware or software modules, as discussed in greater detail below. Further, as indicated above, embodiments described herein may be implemented using computer-readable media (e.g., the memory 412 of FIG. 4) for carrying or having computer-executable instructions or data structures stored thereon.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:

providing a query and context associated with the query to a generative artificial intelligence (Gen AI) model, the Gen AI model configured to generate a response to the query based on the context;

obtaining one or more policies, wherein at least one of the one or more policies are specific to a user;

performing analysis of the response based on the one or more policies;

assigning one or more alignment scores to the response based on the analysis of the response with respect to one or more alignment metrics;

identifying an alignment issue in the response based on a comparison between the one or more alignment scores and one or more thresholds;

causing the Gen AI model to refine the response based on a policy-constrained refinement prompt defined based on the alignment issue and at least one policy of the one or more policies associated with the alignment issue; and updating configuration data of the Gen AI model based one or more action related to refining of the response to reduce recurrence of the alignment issue in future responses.

2. The method of claim 1, wherein the one or more policies include one or more of:

organization policies, use case policies, end user policies, global policies, national policies, or industry policies.

3. The method of claim 1, wherein at least one of the one or more policies are customized by the user.

4. The method of claim 1, wherein at least one of the one or more policies are predetermined.

5. The method of claim 1, further comprising:

generating a report including at least the one or more alignment scores.

6. The method of claim 1, wherein identifying the alignment issue comprises determining that at least one alignment score falls below a corresponding threshold value.

7. The method of claim 1, wherein the one or more alignment metrics include one or more of: tone, formality, clarity, simplicity, helpfulness, or toxicity.

8. The method of claim 1, wherein the causing the Gen AI model to refine the response based on a policy-constrained refinement prompt defined based on the alignment issue and at least one policy of the one or more policies associated with the alignment issue comprises:

identifying individual policies from the one or more policies associated with the alignment issue; and generating the policy-constrained refinement prompt based on the individual policies.

9. The method of claim 1, wherein the Gen AI model is a large language model (LLM).

10. The method of claim 1, wherein updating configuration data of the Gen AI model comprises adjusting operational rules or constraints used by the Gen AI model to generate the future responses.

11. A system comprising:

one or more processors; and one or more non-transitory computer-readable storage media configured to store instructions that, in response to being executed, cause a system to perform operations, the operations comprising:

providing a query and context associated with the query to a generative artificial intelligence (Gen AI) model, the Gen AI model configured to generate a response to the query based on the context;

obtaining one or more policies, wherein at least one of the one or more policies are specific to a user;

performing analysis of the response based on the one or more policies;

assigning one or more alignment scores to the response based on the analysis of the response with respect to one or more alignment metrics;

identifying an alignment issue in the response based on a comparison between the one or more alignment scores and one or more thresholds;

causing the Gen AI model to refine the response based on a policy-constrained refinement prompt defined based on the alignment issue and at least one policy of the one or more policies associated with the alignment issue; and updating configuration data of the Gen AI model based one or more action related to refining of the response to reduce recurrence of the alignment issue in future responses.

12. The system of claim 11, wherein the one or more policies include one or more of:

organization policies, use case policies, end user policies, global policies, national policies, or industry policies.

13. The system of claim 11, wherein at least one of the one or more policies are customized by the user.

14. The system of claim 11, wherein at least one of the one or more policies are predetermined.

15. The system of claim 11, the operations further comprising:

generating a report including at least the one or more alignment scores.

16. The system of claim 11, wherein identifying the alignment issue comprises determining that at least one alignment score falls below a corresponding threshold value.

17. The system of claim 11, wherein the one or more alignment metrics include one or more of: tone, formality, clarity, simplicity, helpfulness, or toxicity.

18. The system of claim 10, wherein the causing the Gen AI model to refine the response based on a policy-constrained refinement prompt defined based on the alignment issue and at least one policy of the one or more policies associated with the alignment issue comprises:

identifying individual policies from the one or more policies associated with the alignment issue; and generating the policy-constrained refinement prompt based on the individual policies.

19. The system of claim 11, wherein the Gen AI model is a large language model (LLM).

20. One or more non-transitory computer-readable media storing instructions that, when executed by one or more processors, cause a system to perform operations, the operations comprising:

providing a query and context associated with the query to a generative artificial intelligence (Gen AI) model, the Gen AI model configured to generate a response to the query based on the context;

obtaining one or more policies, wherein at least one of the one or more policies are specific to a user;

performing analysis of the response based on the one or more policies;

assigning one or more alignment scores to the response based on the analysis of the response with respect to one or more alignment metrics;

identifying an alignment issue in the response based on a comparison between the one or more alignment scores and one or more thresholds;

causing the Gen AI model to refine the response based on a policy-constrained refinement prompt defined based on the alignment issue and at least one policy of the one or more policies associated with the alignment issue; and updating configuration data of the Gen AI model based one or more action related to refining of the response to reduce recurrence of the alignment issue in future responses.

* * * * *